US008071910B2

(12) United States Patent
Okabe et al.

(10) Patent No.: US 8,071,910 B2
(45) Date of Patent: Dec. 6, 2011

(54) LASER PROCESSING APPARATUS

(75) Inventors: Kenji Okabe, Yokohama (JP); Shoichi Tanaka, Ebina (JP); Masashi Kurokawa, Yokohama (JP)

(73) Assignee: Mitutoyo Corporation, Kanagawa (JP)

( * ) Notice: Subject to any disclaimer, the term of this patent is extended or adjusted under 35 U.S.C. 154(b) by 330 days.

(21) Appl. No.: 12/453,613

(22) Filed: May 15, 2009

(65) Prior Publication Data

US 2009/0283506 A1 Nov. 19, 2009

(30) Foreign Application Priority Data

May 15, 2008 (JP) ................................ 2008-127887

(51) Int. Cl.
*B23K 26/00* (2006.01)
(52) U.S. Cl. ......... 219/121.68; 219/121.69; 219/121.76; 219/121.83
(58) Field of Classification Search ............. 219/121.68, 219/121.69, 121.76, 121.83
See application file for complete search history.

(56) References Cited

U.S. PATENT DOCUMENTS

| 3,710,798 | A | * | 1/1973 | Bredemeier | 606/11 |
| 4,789,770 | A | * | 12/1988 | Kasner et al. | 219/121.7 |
| 4,820,899 | A | * | 4/1989 | Hikima et al. | 219/121.76 |
| 4,870,244 | A | * | 9/1989 | Copley et al. | 219/121.7 |
| 4,925,523 | A | * | 5/1990 | Braren et al. | 216/66 |
| 5,164,565 | A | * | 11/1992 | Addiego et al. | 219/121.68 |
| 5,166,493 | A | | 11/1992 | Inagawa et al. | |
| 5,207,576 | A | * | 5/1993 | Vassiliadis et al. | 433/215 |
| 5,650,361 | A | * | 7/1997 | Radhakrishnan | 438/779 |
| 6,608,280 | B2 | * | 8/2003 | Chen et al. | 219/121.76 |
| 7,767,595 | B2 | * | 8/2010 | Tanaka et al. | 438/795 |
| 2004/0011772 | A1 | * | 1/2004 | Okumura | 219/121.69 |

FOREIGN PATENT DOCUMENTS

| EP | 0 365 754 A1 | 5/1990 |
| JP | A-7-66204 | 3/1995 |

* cited by examiner

*Primary Examiner* — M. Alexandra Elve
(74) *Attorney, Agent, or Firm* — Oliff & Berridge, PLC

(57) ABSTRACT

A laser processing apparatus is provided with a first laser oscillator for laser CVD and a second laser oscillator for laser repair in a laser oscillation section. Either one of the first or second laser beam is irradiated by switching the first and second laser oscillators by a laser oscillator switch portion of a main body section. An optical path forming member is disposed such that the first or second laser beam, whichever is irradiated, will take the same optical path and reach a sample, after passing a common slit, to perform laser processing on the sample. Further, an objective lens is configured to be switched to an objective lens having a magnification corresponding to a wavelength of the laser beam irradiated from the laser oscillation section by an objective lens switch section of an objective lens section.

5 Claims, 3 Drawing Sheets

Fig. 2A
Fig. 2B
Fig. 2C
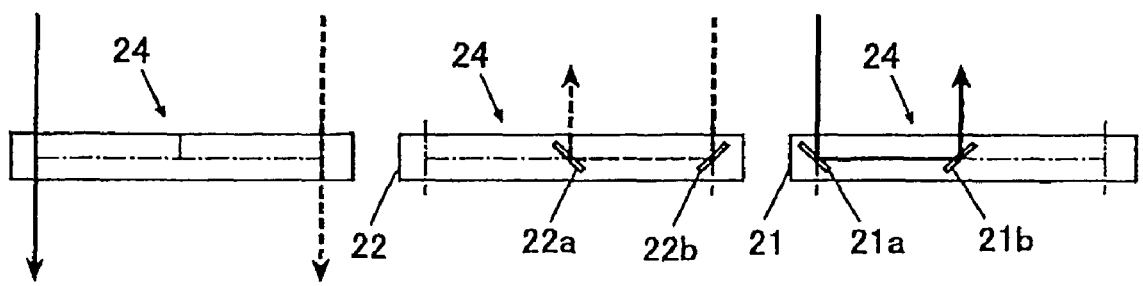
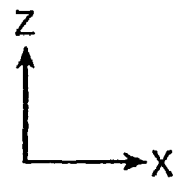

LASER PROCESSING APPARATUS

TECHNICAL FIELD

The present invention relates to a laser processing apparatus.

BACKGROUND

Hitherto, as means for correcting a white defect or a black defect that occurs in a photomask or a FPD (Flat Panel Display), a laser CVD (Chemical Vapor Deposition) method has been used to correct the white defect, and a laser repair method that removes an unnecessary residual defect with a laser beam has been used to correct the black defect.

Since, in many cases, wavelengths of the laser beams used for each of the aforementioned correction means are different from each other, in a case that the aforementioned two types of defects are corrected, laser oscillators that irradiate laser beams having different wavelengths respectively, and separate laser processing apparatuses including the laser oscillators have been used.

However, when both of the white defect and the black defect exist in the same sample, or when both defects need to be corrected, or the like, it is necessary to first mount the sample on one of the laser processing apparatuses for correcting the white defect, for example, then to mount the sample on the another laser processing apparatus for use correcting the black defect. A heavy workload, such as mounting the sample, adjusting a position, or the like, is involved and has been one cause in obstructing improvement of work efficiency. Further, as it is necessary to prepare the laser processing apparatuses for each type of repair, respective costs required for correcting the defects may not be disregarded.

Accordingly, it is desirable to have one laser processing apparatus provided with two laser oscillators irradiating laser beams of different wavelengths. For example, a laser film formation apparatus provided with first and second laser beam irradiation means, and capable of performing removal of film interconnection and a new film formation is well known (for example, refer to Japanese Unexamined Patent Application Publication No. H7-66204)

However, in the laser film formation apparatus described in the Japanese Unexamined Patent Application, as first and second laser beams irradiated by the first and second laser beam irradiation means take different optical paths until reaching an objective lens disposed immediately before the sample, in designing the laser processing apparatus, there is a possibility of having an unfavorable limitation such as an increase of a size of the casing, or the like. Further, slits have to be prepared for each of the optical paths and, therefore, in a case of performing a plurality of repairs requiring only a common slit, there has been a problem that the cost for the unnecessary slit may not be reduced.

In addition, since the laser beams having different wavelengths irradiated by the first and second laser beam irradiation means respectively pass through different positions of the same objective lens, it is common for the objective lens to be formed by using a thin film having high transmission property conforming to respective wavelengths at positions where each laser beams passes. Therefore, there is concern regarding manufacturing costs of the objective lens.

There is, therefore, a need to have different types of laser processing be performable by using a laser processing apparatus without requiring a special optical system in an optical path of laser beams, to reduce the size of the laser processing apparatus, and to provide the apparatus at low cost.

SUMMARY

According to the disclosure, the above need is addressed in part by a laser processing apparatus provided with first and second laser oscillators respectively irradiating first and second laser beams, wavelengths of the first and second laser beams being different from each other. The laser processing apparatus is configured such that either the first or second laser beam is irradiated by switching either one of the first or second laser oscillators. An optical path forming member is disposed such that whichever of the first or second laser beam is irradiated, it takes the same optical path that the other laser beam takes when it is irradiated and reaches a sample, after passing a common slit, to perform laser processing on the sample. Accordingly, different types of laser processing may be performed by one laser processing apparatus using the common slit, and size and cost reduction of the laser processing apparatus may be achieved. Moreover, as the laser processing apparatus is configured to switch the objective lens to an objective lens with a predetermined magnification corresponding to a laser wavelength of the first or second laser beam, either one of the first or second laser beam may easily irradiate the sample by switching the objective lens to an objective lens with a different magnification without using a special optical system.

Therefore, aspects of the disclosure can cause one laser processing apparatus to be able to perform different types of laser processing without requiring a special optical system in the optical path of the laser beam, reduces a size of the laser processing apparatus, and provides the apparatus at lower cost.

BRIEF DESCRIPTION OF THE SEVERAL VIEWS OF THE DRAWINGS

Reference is made to the attached drawings, wherein elements having the same reference designations represent like elements throughout, and wherein:

FIG. 2 is an enlarged view of main part illustrating a state where a laser beam for laser CVD, or for laser repair is irradiated to a movable section 24 of the laser processing apparatus 1 with respect to the present invention, in which (A) illustrates a state where the laser beam for laser CVD or for laser repair transmits, (B) illustrates a state where the laser beam for laser repair (or laser defect correction) is reflected, and (C) illustrates a state where the laser beam for laser CVD is reflected.

DETAILED DESCRIPTION OF THE EMBODIMENTS

Only exemplary embodiments of a laser processing apparatus of the disclosure is shown and described in the present disclosure. It is to be understood that the scope of the present invention is not limited to the exemplary embodiments.

Figure 1A:
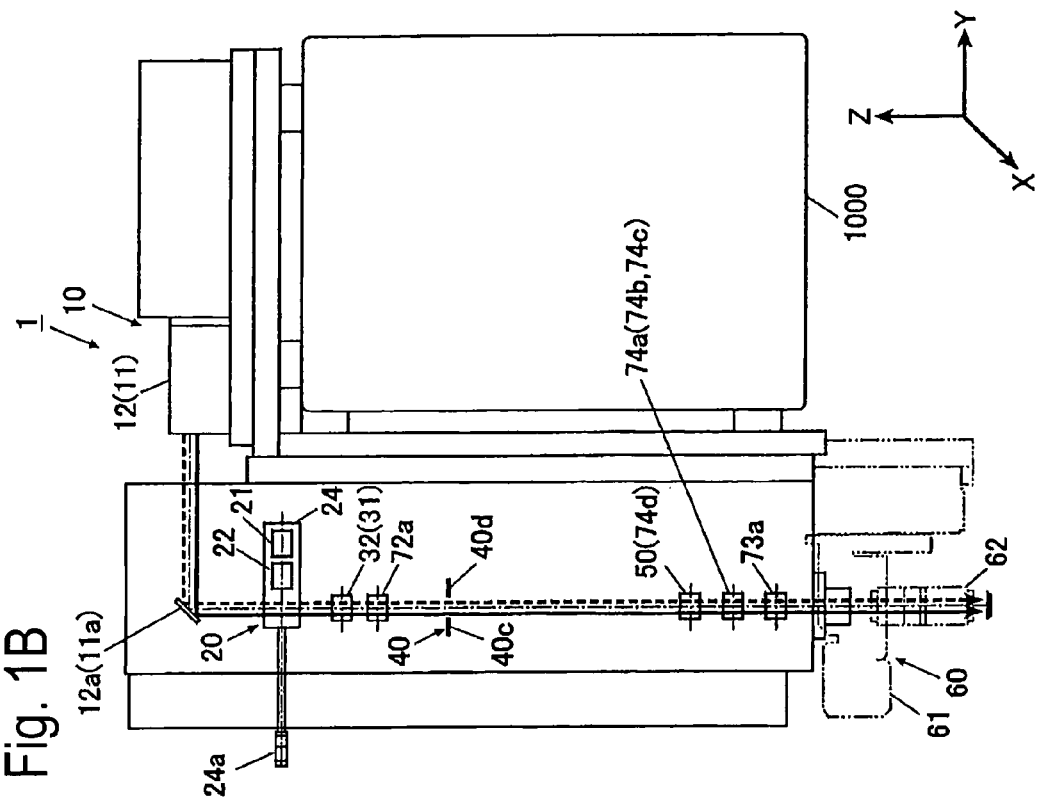
FIG. 1 is a view illustrating a schematic configuration of a laser processing apparatus 1 with respect to the present invention, in which (A) is front elevation, and (B) is side elevation.
Figure 1B:
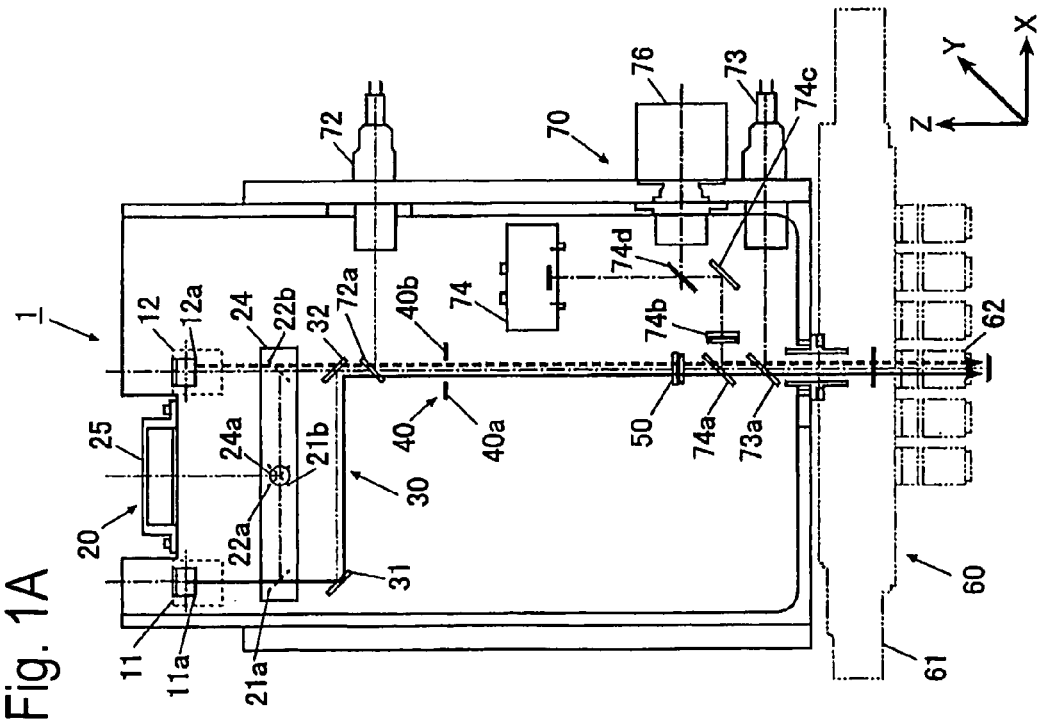
Figure 3:
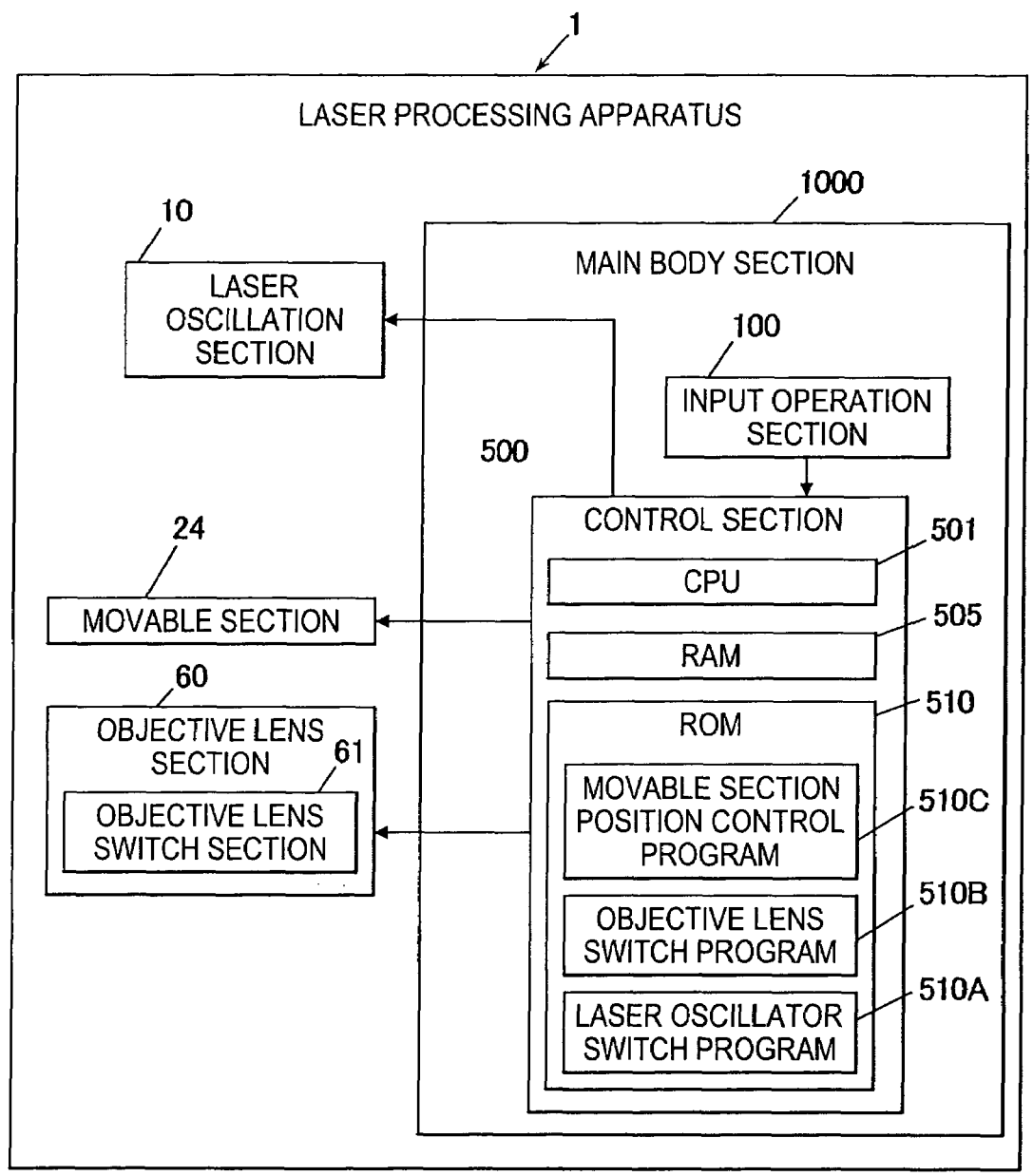
FIG. 3 is a block diagram of the laser processing apparatus 1 with respect to the present invention.

FIG. 1 illustrates a schematic configuration of an exemplary laser processing apparatus 1, FIG. 1(A) is a front elevation, and FIG. 1(B) is a side elevation. FIG. 2 illustrates a state when a laser beam for the laser CVD or laser repair enters into a movable section 24 of the laser processing apparatus 1. FIG. 2(A) is an enlarged view of main part illustrating a state in which the laser beam for the laser CVD or the laser beam for the laser repair is transmitted; FIG. 2(B) is an enlarged view of main part illustrating a state in which the laser beam for use in the laser repair is reflected; and FIG. 2(C) is an enlarged view of main part illustrating a state in which the laser beam for the laser CVD is reflected. FIG. 3 is a block diagram of the laser processing apparatus 1.

Incidentally, in the following explanation, a left and right direction of the laser processing apparatus 1 is indicated as an X-axis direction, a back and forth direction thereof is indicated as a Y-axis direction, and an up and down direction thereof is indicated as a Z-axis direction.

As illustrated in FIG. 1, the laser processing apparatus 1 is configured to include, for example, a laser oscillation section 10 for irradiating a laser beam (first laser beam) for laser CVD and another laser beam (second laser beam) for laser repair, a measurement section 20 for checking an outputting state of the laser beam, an optical path forming section 30 for forming an optical path so that different types of laser beams irradiated from the laser oscillation section 10 may take the same optical path, a slit 40 for limiting a reaching area of the laser beam to the sample, a tube lens 50 and an objective lens section 60 for focusing the laser beam onto the sample, an observation section 70 for observing the sample mounted on a stage (not shown) or a slit processing area of the sample, a main body section 1000 for performing various types of control processing of the laser processing apparatus 1, and so forth.

The laser oscillation section 10 is provided with a laser oscillator 11 for laser CVD as a first laser oscillator, a laser oscillator 12 for laser repair as a second laser oscillator, a mirror 11a or 12a for leading the laser beam irradiated from the laser oscillator 11 for laser CVD or the laser oscillator 12 for laser repair to the optical path, and so forth, and is configured to be able to switch the oscillator to either the laser oscillator 11 for laser CVD or the laser oscillator 12 for laser repair when a switch button of a later-described input operation section 100 is pressed down.

The laser oscillator 11 for the laser CVD functions as a laser beam source for irradiating the laser beam for the laser CVD. Here, the laser beam for the laser CVD is used in the laser CVD method, wherein a desired thin film is accumulated in raw material gas by thermal decomposition or photolysis, and is a laser beam having a wavelength in an ultraviolet region. A white defect occurring in a sample may be corrected by irradiating the laser beam onto the sample such as a photomask, FPD, or the like.

A mirror 11a reflects a laser beam for laser CVD from a Y-axis direction (forward), to a Z-axis direction (downward). The laser beam being irradiated from the laser oscillator 11 is for use in the laser CVD.

The laser oscillator 12 for the laser repair functions as a laser beam source for irradiating the laser beam for laser repair. Here, the laser beam for the laser repair is used in the laser repair method, wherein a laser beam is irradiated onto a defect occurring in the sample to remove the defect, and is a laser beam having a wavelength in a range from the ultraviolet region to an infrared region. A black defect occurring in the sample may be corrected by irradiating the laser beam onto the sample such as the photomask, FPD, or the like.

A mirror 12a reflects the laser beam for laser repair from the Y-axis direction (forward), to the Z-axis direction (downward). The laser beam being irradiated from the laser oscillator 12 is for use in the laser repair.

As illustrated in FIG. 1, the measurement section 20 includes a movable section 24 being movable in the Y-axis direction and reflecting either the laser beam for laser CVD or the laser beam for laser repair with a mirror provided at a predetermined position in the Y-axis direction, a measuring instrument 25, and so forth. The measurement section detects the laser beam output from the laser oscillator 11 for the laser CVD or the laser oscillator 12 for the laser repair to check the outputting state of the laser beam.

The movable section 24, as illustrated in FIG. 1 and FIG. 2(A), is a case formed with, for example, a glass substrate transmitting the laser beam, and so forth, and is provided with a reflection section 21 for laser CVD reflecting the laser beam for laser CVD, and a reflection section 22 for laser repair reflecting the laser beam for the laser repair, at a predetermined interval in the Y-axis direction inside the case. The movable section 24 is configured such that a driving force is applied to a shaft portion 24a (extending to a front face (Y-axis, forward direction) of the laser processing apparatus 1) by a motor or the like (not shown), and the movable section 24 is movable in the Y-axis direction. Therefore, the position of the movable section 24 is adjusted in the Y-axis direction in response to pressing down of a switch button and/or a measuring button of the input operation section 100 described later, so that transmission/reflection of the laser beam for the laser CVD or the laser beam for the laser repair may be performed.

Incidentally, the movable section 24 may also be a part in which the position in the Y-axis direction may be manually adjusted.

The reflection section 22 for laser repair is provided with a second optical element, mirrors 22a and 22b. Both mirrors reflect the laser beam as illustrated in FIG. 2(B). The positions and angles of mirrors 22a and 22b are set such that when the position of the movable section 24 is adjusted in the Y-axis direction and the reflection section 22 for laser repair is disposed in the optical path, the laser beam irradiated toward the Z-axis direction (downward) by the laser oscillator 12 for laser repair is reflected to the X-axis direction (leftward) toward the mirror 22a by the mirror 22b, and the reflected beam is further reflected toward the Z-axis direction (upward) by the mirror 22a to enter into the measuring instrument 25.

The reflection section 21 for laser CVD is provided with the first optical element including mirrors 21a and 21b both mirrors reflecting the laser beam as illustrated in FIG. 2(C). The positions and angles of the mirror 21a and the mirror 21b are set such that when the position of the movable section 24 is adjusted in the Y-axis direction and the reflection section 21 for laser CVD is disposed in the optical path, the laser beam irradiated toward the Z-axis direction (downward) by the laser oscillator 11 for the laser CVD is reflected in the X-axis direction (rightward) toward the mirror 21b by the mirror 21a, and the reflected beam from mirror 21a is then reflected toward the Z-axis direction (upward) by the mirror 21b to enter into the measuring instrument 25.

The measuring instrument 25 includes, for example, a power meter as a measuring instrument that measures an output of a laser beam, and is able to detect the beam that is reflected by a reflection section 21 for laser CVD, or a reflection section 22 for laser repair, and check a state of the output of power of each of the laser beams irradiated by the laser oscillation section 10.

Further, the result of the output of laser power measured by the measuring instrument 25 is fed back to the laser oscillator 11 for laser CVD or the laser oscillator 12 for laser repair, and the laser oscillators 11 or 12 are automatically adjusted to output desired laser power.

An optical path-forming section 30 includes, for example, a mirror 31 and a half-mirror 32, as illustrated in FIG. 1.

The laser beam for laser CVD irradiated from the laser oscillator 11 for laser CVD in a Z-axis (downward) is reflected by the mirror 31 toward an X-axis direction (rightward).

The half-mirror 32 reflects the laser beam for the laser CVD reflected by the mirror 31 toward the Z-axis direction (downward), and transmits the laser beam for laser repair irradiated from the laser oscillator 12 for laser repair.

Accordingly, as the optical path is formed by an optical path-forming section 30 such that any laser beam irradiated from the laser oscillation section 10 takes the same optical path before reaching the slit 40, different types of laser processing may be performed using the same slit 40.

As illustrated in FIGS. 1(A) and 1(B), the slit 40 is disposed between the optical path-forming section 30 and a tube lens 50 in the optical path, and includes a set of slit members 40a and 40b and a set of slit members 40c and 40d. Both members in the sets are provided opposite to each other so that the laser beams may be controlled to be transmitted only through a clearance (slit-opening portion) formed by the slit members 40a through 40d.

Moreover, the slit members 40a and 40b form a variable slit capable of adjusting slit width in the X-axis direction. The user may adjust a processing area of a sample by adjusting the slit width to a predetermined value.

Incidentally, there may be a system in which the slit width in the Y-axis direction formed by the slit members 40c and 40d is adjustable to a predetermined value, while the slit members 40a and 40b are located at fixed positions. In such system, slit members 40c and 40d form a variable slit. There may be another system in which both of the slit widths in the X-axis direction and the Y-axis direction are adjusted, while height of the slit members 40a and 40b, and the slit members 40c and 40d, are respectively adjusted in the Z-axis direction. In such system, all of the slit members 40a through 40b respectively form variable slits.

The tube lens 50 irradiates the beam passed through the slit-opening portion of the slit 40 to the sample by being combined with an objective lens section 60 described later.

The objective lens section 60 is configured to include a plurality of objective lenses having different magnifications, and an objective lens switch section 61 on which the plurality of objective lenses are mounted in the X-axis direction at a predetermined interval. The objective lens switch section 61 linearly drives the plurality of objective lenses in the X-axis direction by being applied with a driving force by, for example, a motor or the like. Accordingly, the objective lens section 60 is configured such that when a switch button of an input operation section 100 (described later) is pressed down and a laser oscillator (laser beam) irradiated from the laser oscillation section 10 is switched, the objective lens switch section 61 is moved in the X-axis direction by a predetermined amount corresponding to a laser wavelength of the laser beam irradiated after being switched, and the objective lens is switched to an objective lens having a predetermined magnification (for example, an objective lens 62) and is disposed in the optical path to irradiate a slit-shaped laser beam to the sample.

Incidentally, the objective lens switch section 61 may also be mounted with a plurality of objective lenses having different magnifications, and the plurality of objective lenses are manually switched.

An observation section 70 is configured to include a light source 72 for slit illumination; a half-mirror 72a for reflecting light in the X-axis direction (leftward), the light being emitted from the light source 72 for slit illumination, to an optical path direction (Z-axis direction, downward); a light source 73 for epi-illumination; a half-mirror 73a for reflecting light in the X-axis direction (leftward), the light being emitted from the light source 73 for epi-illumination, to the optical path direction (Z-axis direction, downward); a CCD camera 74 for observation and a CCD camera 76 for autofocus; a half-mirror 74a for obtaining reflection light for observation; a tube lens 74b; a mirror 74c; and a beam splitter 74d.

The light source 72 for slit illumination emits illumination light in a direction intersecting with the optical path (for example, X-axis direction, leftward), and the illumination light is reflected in the optical path direction (Z-axis direction, downward) by the half-mirror 72a provided on an optical path, and is irradiated to the sample through the tube lens 50 and the objective lens section 60, while being transmitted through the slit opening portion of the slit 40.

The light source 73 for epi-illumination emits the illumination light in a direction intersecting with the optical path (for example, X-axis direction, leftward), and the illumination light is reflected in the optical path direction by the half-mirror 73a provided on the optical path, and is irradiated to the sample through the tube lens 50 and the objective lens section 60.

The CCD camera 74 for observation and the CCD camera 76 for autofocus receive the illumination light of the light source 73 for the epi-illumination or the light source 72 for slit illumination, which is reflected by the sample, and perform projection for the sample and the area on the sample where the slit processing is performed, and focus adjustment, respectively.

That is, the illumination light of the light source 73 for epi-illumination or the light source 72 for slit illumination reflected by the sample becomes parallel light after passing through the objective lens 62 of the objective lens section 60, and is reflected to a direction intersecting with the optical path (X-axis direction, rightward) at the half-mirror 74a. Further, as for the reflected light, the aforementioned parallel light is intermediately imaged by the tube lens 74b, reflected in a direction in parallel with the optical path (Z-axis direction, upward) by the mirror 74c, divided into the light transmitted in a straight line manner by the beam splitter 74d and the light reflected in the direction intersecting with the optical path, and are received by the CCD camera 74 for observation, and the CCD camera 76 for autofocus.

Therefore, by receiving the reflected light of the illumination light irradiated to the sample from the light source 72 for slit illumination and the light source 73 for epi-illumination, a user may accurately observe the sample and the area on the sample where the laser processing is performed via the CCD camera 74 for observation, in a focusing state with the CCD camera 76 for autofocus.

Accordingly, the area for which the laser processing is performed (slit width) may be adjusted by the slit 40 in advance, while visually confirming with the CCD camera 74 for observation. Therefore accurate correction for a white defect and a black defect may be performed.

A main body section 1000 is provided with the input operation section 100 and a control section 500 as illustrated in FIG. 3, and performs an entire control operation for the laser processing apparatus 1.

The input operation section 100 is configured to include, for example, a switch button (not shown) for switching from the laser oscillator 11 for laser CVD or from the laser oscillator 12 for laser repair of the laser oscillation section 10, a measuring button (not shown) for measuring the laser beam for laser CVD or the laser beam for laser repair, and so forth. When the above button is pressed down by a user, the input operation section 100 outputs a predetermined press-down signal to the control section 500.

The control section 500 is configured to include a CPU 501, a RAM 505, a ROM 510, and so forth, and is connected to the laser oscillation section 10, the objective lens section 60, and the movable section 24. The control section 500 performs a control operation for each section in response to the predetermined press-down signal output from the input operation section 100.

The CPU 501 executes various processing programs stored in the ROM 510, and stores processing data in the RAM 505.

The RAM 505 includes a program storage area for developing the processing program or the like executed by the CPU 501, and a data storage area for storing data such as a processed result or the like, generated when the input data or the aforementioned processing program is executed.

The ROM 510 stores, for example, various processing programs such as a laser oscillator switch program 510A, an objective lens switch program 510B, a movable section position control program 510C, and so forth, all of which are executed by the CPU 501.

The laser oscillator switch program 510A executes control for switching the laser oscillators (laser oscillator 11 for a laser CVD or laser oscillator 12 for laser repair) to be used in response to the press-down signal of the switch button of the input operation section 100.

That is, when a user presses down the switch button of the input operation section 100, the CPU 501 executes the laser oscillator switch program 510A, and transmits an output signal to switch either one of the laser oscillator 11 for the laser CVD or the laser oscillator 12 for the laser repair to the laser oscillation section 10, and the laser oscillator in an outgoing state is switched by the laser oscillation section 10. Therefore, the laser beam to be irradiated to the sample may be switched in accordance with the processing content of the user.

The objective lens switch program 510B executes a control operation for switching the objective lens of the objective lens section 60 to be used in response to the press-down signal of the switch button of the input operation section 100.

That is, when a user presses down the switch button of the input operation section 100, the CPU 501 executes the laser oscillator switch program 510A and either one of the laser oscillator 11 for laser CVD or the laser oscillator 12 for laser repair is switched. Further, the CPU 501 executes the objective lens switch program 510B and thereby the objective lens switch section 61 is driven in response to the laser wavelength of the laser beam irradiated from the switched laser oscillator, and the objective lens may be switched to the objective lens having the predetermined magnification. Thus, even when any one of the laser beams is irradiated from the laser oscillation section 10, the appropriate laser beam may be irradiated to the sample.

The movable section position control program 510C adjusts and controls a position of the movable section 24 in the Y-axis direction in response to the press-down signal of the switch button or the measuring button of the input operation section 100.

That is, when a user presses down the switch button of the input operation section 100, the CPU 501 executes the movable section position control program 510C, drives a shaft portion 24a by a predetermined amount and adjusts the position of the movable section 24 in the Y-axis direction such that the reflection section 21 for the laser CVD and the reflection section 22 for the laser repair are not disposed in the optical path, and controls the position of the movable section 24 such that the laser beam is transmitted and irradiated to the sample even when the laser beam is irradiated from any one of the oscillators of the laser oscillation section 10. On the other hand, the movable section position control program 510C is configured such that when a user presses down the measuring button of the input operation section 100, the CPU 501 executes the movable section position control program 510C, drives the shaft portion 24a by a predetermined amount, and disposes any one of the reflection section 21 for laser CVD and the reflection section 22 for laser repair in the optical path in accordance with a type of the laser beam irradiated from the laser oscillation section 10 and thereby the reflected beam may be detected by the measuring instrument 25.

Next, a switch operation for the laser beam irradiated from the laser oscillation section 10 and processing for checking an output state of the laser beam are described.

First, when the switch button of the input operation section 100 is pressed down, the CPU 501 executes the laser oscillator switch program 510A, and switches either one of the laser oscillator 11 for the laser CVD or the laser oscillator 12 for the laser repair of the laser oscillation section 10. Further, simultaneously, CPU 501 executes the objective lens switch program 510B and the objective lens switch section 61 moves in the X axis direction by a predetermined amount so that an objective lens having a magnification appropriate for the laser beam irradiated after the aforementioned switch operation is performed is disposed in the optical path. Then, the CPU 501 executes the movable section position control program 510C and drives the shaft portion 24a by a predetermined amount, and thereby the position of the movable section 24 in the Y-axis direction is adjusted so that the reflection section 21 for the laser CVD and the reflection section 22 for the laser repair is not disposed in the optical path, and the irradiated laser beam is transmitted. As described above, as the laser beam irradiated from the switched laser oscillator is irradiated to the sample, the laser processing according to the processing content of the user may be performed.

Next, in this state, when the measuring button of the input operation section 100 is pressed down, the CPU 501 executes movable section position control program 510C, and drives the shaft portion 24a by a predetermined amount, and the position of the movable section 24 in the Y-axis direction is adjusted so that either one of the reflection section 21 for laser CVD or the reflection section 22 for laser repair is disposed in the optical path in accordance the type of laser beam irradiated from the laser oscillation section 10. Thus, the reflected beam may be detected by the measuring instrument 25 and the output state of the laser power may be checked.

As described above, in the laser processing apparatus 1 with respect to the present invention, the laser oscillation section 10 is provided with the laser oscillator 11 for laser CVD and the laser oscillator 12 for laser repair, and the laser beam irradiated after switching the oscillator to either one of the oscillators by the laser oscillator switch program 510A performs the laser processing after reaching at the sample, while following same optical path and using the same slit 40 that the other laser beam followed and used to reach the sample before being switched. Accordingly, different laser types of processing may be performed by one laser processing apparatus 1 using a common slit 40, and size and cost reduction of the laser processing apparatus 1 may be achieved. Further, since the objective lens of the objective lens section 60 is configured to be switched to an objective lens having a predetermined magnification corresponding to a wavelength of the laser beam irradiated from the laser oscillation section 10 by the objective lens switch section 61, even without using a particular optical system, and even when any one of the laser beams irradiated from the laser oscillation section 10 is used, the laser beam may easily be irradiated by switching to the objective lens having a different magnification.

Furthermore, in the laser oscillation section 10, the laser oscillator 11 for laser CVD and the laser oscillator 12 for laser repair are provided, and the laser beam for laser CVD or the laser beam for laser repair may be irradiated to the sample.

Accordingly, as the laser processing by the laser CVD method and the laser processing by the laser repair method may be performed by the same laser processing apparatus 1, for example, when both of a white defect and a black defect occur in the same sample, it is not necessary to mount the sample on a laser processing apparatus for white repair and then to mount the same sample on a laser processing apparatus for black repair. This improves work efficiency, and as one laser processing apparatus may be eliminated, costs required for correcting the defect may be reduced to a large extent.

Moreover, in the laser processing apparatus 1, the movable section 24 that may switch and arrange the reflection section 21 for laser CVD including the mirrors 21a and 21b, and the reflection section 22 for laser repair including the mirrors 22a and 22b in the optical path and the measuring section 20 capable of receiving the laser beam reflected by the reflection section 21 for laser CVD or the reflection section 22 for laser repair, measuring the output of the laser beam are provided, and checking an output state of the laser beam irradiated from the laser oscillator 11 for the laser CVD or the laser oscillator 12 for the laser repair.

Accordingly, as the output state of laser power of the laser beam output from the laser oscillator 11 for laser CVD or the laser oscillator 12 for laser repair may be easily checked, the work efficiency at a time of problem with the laser processing apparatus 1, or during a maintenance/inspection period, is improved.

Further, in the laser processing apparatus 1, the light source 72 for slit illumination irradiating light to the slit 40, and the observation section 70 observing the light that is irradiated from the light source 72 for slit illumination, transmitted through the slit 40, reflected by the sample surface, and received by the CCD camera 74 for observation and the CCD camera 76 for autofocus, or the like, are provided.

Accordingly, a user may perform accurate laser processing by observing in advance an area in the sample where the laser processing is to be performed and adjusting slit width of the slit 40 to a predetermined value.

Incidentally, the objective lens switch section 61 with respect to the present invention is only required to be able to be mounted with a plurality of objective lenses, and arrange a predetermined objective lens in an optical path after switching the objective lens. Therefore, a rotary revolver method, or the like, may also be applicable.

Furthermore, the first and second laser oscillators with respect to the present invention are not limited to the laser oscillator for laser CVD and the laser oscillator for laser repair, and other oscillators, each irradiating a laser beam for laser processing, may also be applicable.

What is claimed is:

1. A laser processing apparatus for processing a sample by irradiating a laser beam thereto, comprising:
    a first laser oscillator and a second laser oscillator respectively irradiating a first laser beam and a second laser beam, wavelengths of the first and second laser beams being different from each other;
    a switch that is configured to switch the first laser oscillator to the second laser oscillator or the second laser oscillator to the first laser oscillator so that either one of the first laser beam or the second laser beam is irradiated;
    a slit provided in an optical path for leading to the sample whichever one of the first laser beam or the second laser beam is being irradiated after the switching by the switch;
    an optical path forming member forming the optical path and disposed such that whichever one of the first laser beam or the second laser beam is being irradiated after the switching by the switch passes through the slit; and
    an objective lens switch that is configured to switch between a plurality of objective lenses, the objective lens switch being disposed between the slit and the sample and switching one of the plurality of objective lenses that is in the optical path to another of the plurality of objective lens having a predetermined magnification corresponding to the laser wavelength of whichever one of the first laser beam or the second laser beam passes through the slit.

2. The laser processing apparatus according to claim 1, wherein the first laser beam is a laser beam for laser CVD, and the second laser beam is a laser beam for laser repair.

3. The laser processing apparatus according to claim 1, further comprising:
    a first optical element positioned in the optical path of the first laser beam to reflect the first laser beam, and being configured to be retracted to a position away from the optical path of the first laser beam;
    a second optical element positioned in the optical path of the second laser beam to reflect the second laser beam, and being configured to be retracted to a position away from the optical path of the second laser beam;
    a reflected beam obtainment device that is configured to obtain the reflected beam of the first laser beam or the second laser beam respectively, the reflected beams being reflected by the first optical element or the second optical element, both of which are disposed in the optical path, in accordance with whichever one of the first laser beam or the second laser beam is being irradiated after the switching by the switch; and
    output state check device that is configured to check an output state of the first laser oscillator or the second laser oscillator on the basis of the reflected beam obtained by the reflected beam obtainment device.

4. The laser processing apparatus according to claim 1, further comprising:
    a light source for irradiating light to the slit, the light conforming to a beam axis of the laser beam; and
    an observation section for observing the light after being irradiated from the light source, transmitted through the slit, and reflected from a sample surface, wherein the observation section includes autofocus.

5. The laser processing apparatus according to claim 3, further comprising:
    a light source for irradiating light to the slit, the light conforming to a beam axis of the laser beam; and
    an observation section for observing the light after being irradiated from the light source, transmitted through the slit, and reflected from a sample surface.

* * * * *